US010059266B2

(12) United States Patent
Kosidlo et al.

(10) Patent No.: US 10,059,266 B2
(45) Date of Patent: Aug. 28, 2018

(54) ADJUSTMENT UNIT, REAR VIEW DEVICE AND VEHICLE

(71) Applicant: SMR Patents S.à.r.l., Luxembourg (LU)

(72) Inventors: Urszula Kosidlo, Korntal-Münchingen (DE); Andreas Herrmann, Winnenden-Baach (DE)

(73) Assignee: SMR Patents S.à.r.l., Luxembourg (LU)

( * ) Notice: Subject to any disclaimer, the term of this patent is extended or adjusted under 35 U.S.C. 154(b) by 62 days.

(21) Appl. No.: 15/153,106

(22) Filed: May 12, 2016

(65) Prior Publication Data
US 2016/0332576 A1 Nov. 17, 2016

(30) Foreign Application Priority Data

May 12, 2015 (EP) .................................. 15167367

(51) Int. Cl.
B60R 1/02 (2006.01)
B60R 1/062 (2006.01)
(Continued)

(52) U.S. Cl.
CPC ................ B60R 1/025 (2013.01); B60R 1/04 (2013.01); B60R 1/062 (2013.01); B60R 1/12 (2013.01);
(Continued)

(58) Field of Classification Search
CPC .. B60R 1/04; B60R 1/06; B60R 1/062; B60R 1/072; B60R 1/025
(Continued)

(56) References Cited

U.S. PATENT DOCUMENTS 4,027,953 A * 6/1977 Jacob ...................... B60R 1/025
359/877
5,166,832 A * 11/1992 Zychowicz ............ B60R 1/074
248/479
(Continued)

FOREIGN PATENT DOCUMENTS

EP 0173433 A1 3/1986
EP 0405773 A1 * 1/1991 ............ B60R 1/074
(Continued)

OTHER PUBLICATIONS

European Extended Search Report, Application No. 15167367.0, dated Nov. 12, 2015.

Primary Examiner — Hilary L Gutman
(74) Attorney, Agent, or Firm — MacMillan, Sobanski & Todd, LLC

(57) ABSTRACT

An adjustment unit for a rear view device for a vehicle includes a pivot and a carrier. The carrier is tiltably mounted to the pivot. The adjustment unit includes at least one first bending actuator, which has its largest dimension in a first direction and which is bendably adjustable in an angular or crosswise direction relative to the first direction. The first bending actuator has a first end fixed to a first fastening means and a second end fixed to the carrier. At least one second bending actuator has its largest dimension in a second direction oriented angularly or crosswise relative to the first direction and is bendable angular or crosswise relative thereto. The second bending actuator has a first end fixed to the first fastening means or a further fastening means and a second end fixed to the carrier. The adjustment unit is characterized in that the first direction of the first bending actuator and/or the second direction of the second bending actuator run through the center of the pivot.

13 Claims, 2 Drawing Sheets

(51) Int. Cl.
B60R 1/04 (2006.01)
B60R 1/12 (2006.01)

(52) U.S. Cl.
CPC ............... *B60R 2001/1223* (2013.01); *B60R 2001/1253* (2013.01)

(58) Field of Classification Search
USPC .................................... 296/1.11; 359/876
See application file for complete search history.

(56) References Cited

U.S. PATENT DOCUMENTS

| | | | |
|---|---|---|---|
| 6,164,784 A * | 12/2000 | Butera | B60R 1/087 359/603 |
| 6,364,496 B1 * | 4/2002 | Boddy | B60R 1/072 248/476 |
| 7,117,673 B2 * | 10/2006 | Szilagyi | B23Q 1/5462 60/527 |
| 2013/0176628 A1 * | 7/2013 | Batchko | G02B 3/12 359/665 |
| 2016/0004032 A1 * | 1/2016 | Wiklof | G02B 7/10 359/846 |

FOREIGN PATENT DOCUMENTS

| | | | | |
|---|---|---|---|---|
| EP | 0460666 A1 * | 12/1991 | ............ | B60R 1/072 |
| EP | 2884103 A1 * | 6/2015 | ............ | B60R 1/072 |
| JP | 57138441 A | 8/1982 | | |
| WO | WO-2015087260 A1 * | 6/2015 | ............ | B60R 1/072 |

* cited by examiner

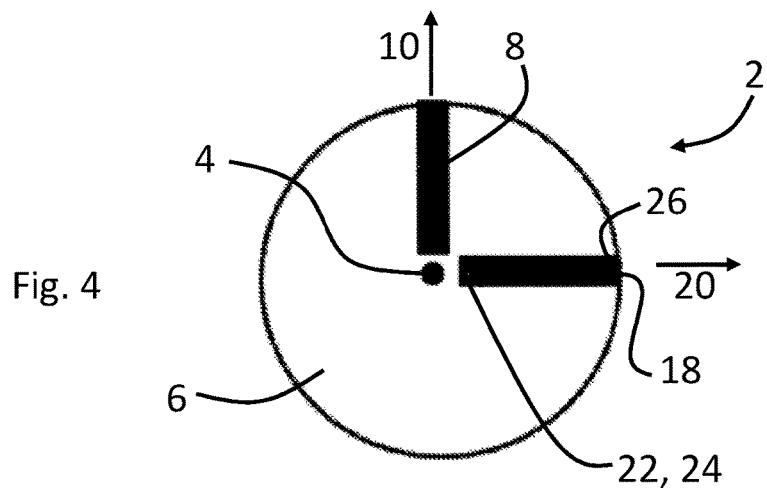
Fig. 4
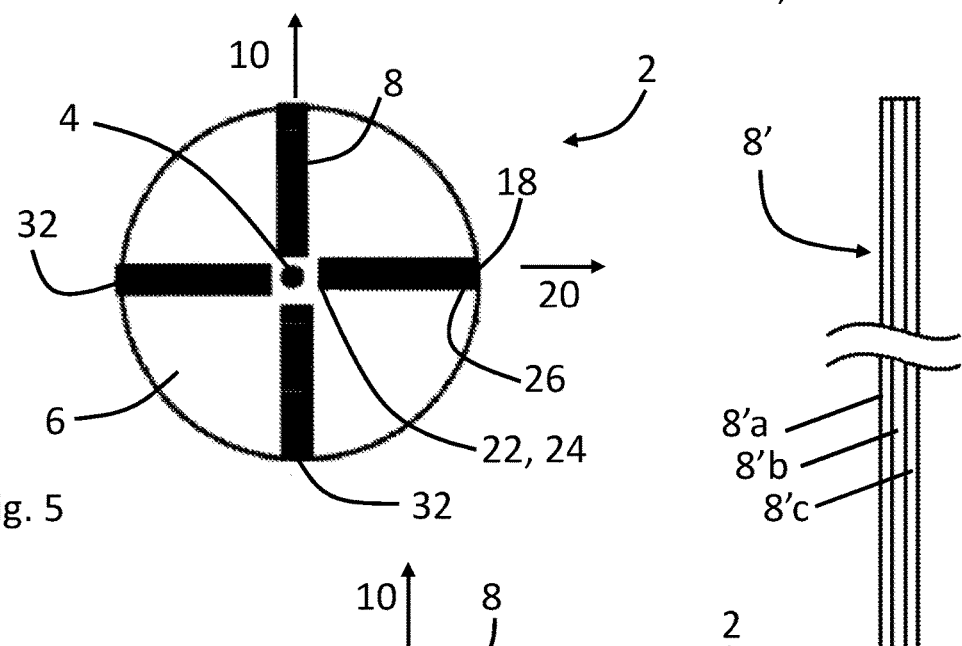
Fig. 5
Fig. 7
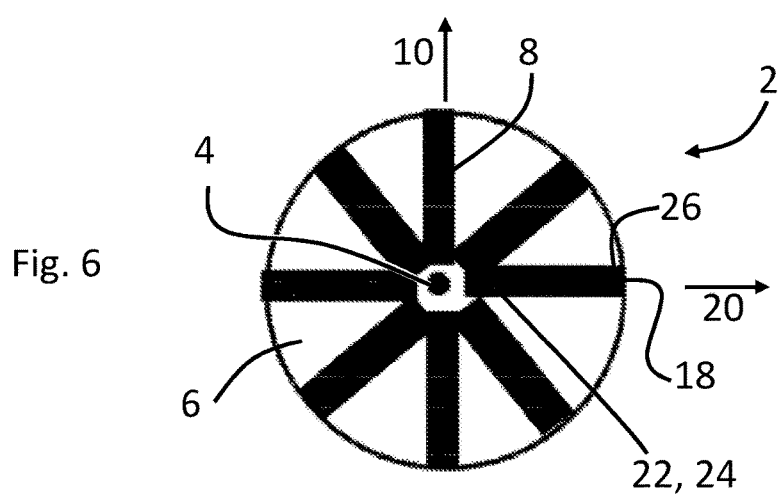
Fig. 6

ADJUSTMENT UNIT, REAR VIEW DEVICE AND VEHICLE

CROSS-REFERENCE TO RELATED APPLICATIONS

This application claims priority from European Patent Application No. 15167367.0 filed on May 12, 2015. The disclosure of this application is incorporated herein by reference.

BACKGROUND OF THE INVENTION

This invention relates to an adjustment unit for a rear view device for a vehicle, with a pivot, with a carrier mounted moveable, in particular tiltable, to the pivot, with at least one first bending actuator, which has its largest dimension in a first direction, which is adjustable bendable angular or crosswise to the first direction, which is fixed with a first end to a first fastening means and which is fixed with a second end to the carrier, and with at least one second bending actuator, which has its largest dimension in a second direction angular or crosswise to the first direction, which is bendable angular or crosswise to the second direction, which is fixed with a first end to the first fastening means or to a further fastening means and which is fixed with a second end to the carrier, wherein a bending of the first bending actuator and/or of the second bending actuator effects a movement of the carrier. The invention further relates to a rear view device with such an adjustment unit and to a vehicle with such an adjustment unit and/or such a rear view device.

Adjustment units for rear view devices for vehicles are known by the state in the art, i. e. in the technical field of rear view mirror of vehicles. The known adjustment units are based on mechanical actuators which are driven by an electromotor.

Another adjustment unit is known from US 2012/0208330 A1 with an adjustment unit having a plurality of meander-shaped bending actuators.

SUMMARY OF THE INVENTION

One purpose of one embodiment of the invention is to provide an adjustment unit for a rear view device that is build simple and space-saving.

The task is achieved by an above mentioned adjustment unit, which is characterized in that the first direction of the first bending actuator and/or the second direction of the second actuator run through the centre of the pivot.

The carrier can be mounted to the pivot in any way as long as the carrier is mounted movable to the pivot. It is advantageously if the carrier is mounted with its centre of mass or center of area to the pivot. Further the carrier can be mounted to the pivot in a manner that it is movable i. e. rotatable or slideable. It is preferred that the carrier is mounted to the pivot in a tiltable manner.

Because the first bending actuator and the second bending actuator are fixed with their second arms to the carrier a bending of the first bending actuator and/or the second bending actuator results in movement, in particular a tilting, of the carrier.

Because of the fact that the first direction of the first bending and the second direction of the second actuator run to the centre of the pivot the first bending actuator and the second bending actuator are arranged extending radially in respect to the pivot. Doing so, the adjustment unit is built compact and simple.

To effect a bending of the bending actuators it is preferred that the at least one first bending actuator is connectable or connected to a first stimuli supply and that the adjustable bendability angular or crosswise to the first direction is depending on the stimuli applied by the first power supply and/or that the at least one second bending actuator is connectable or connected to the first stimuli supply or to a second stimuli source and that the adjustable bendability angular or crosswise to the second direction is depending on the stimuli applied by the first or second stimuli supply.

The adjusting of the bending of the bending actuators can be refined if the adjustment unit comprises at least one further bending actuator which has its largest dimension in a further direction, which is connectable or connected to the first stimuli supply or to a further stimuli supply, which is adjustable bendable angular or crosswise to the further direction depending on the stimuli applied by the first stimuli supply or by the further stimuli supply, which is fixed with a first end to the first fastening means or to a further fastening means and which is fixed with a second end to the carrier.

The first bending actuator, the second bending actuator and the at least one further bending actuator can be arranged around the pivot building a cross-like or a star-like pattern.

In general, the first bending actuator, the second bending actuator and the further bending actuator can comprise deferring length in particular in the direction of the largest dimension. The adjustment unit can be built cost-effective if the bending actuators comprise equal length concerning their direction of largest dimension. Doing so, only one kind of bending actuator has to be produced.

By an further embodiment of the adjustment unit it is preferred, that the at least one first bending actuator, the at least second bending actuator and/or at least one further bending actuator is/are adjustable bendable in a direction facing the carrier or facing away from the carrier to push and/or to pull the carrier.

If the adjustment unit only comprises one first bending actuator and one second bending actuator it is preferred that both bending actuators are adjustable bendable in both directions, facing the carrier and facing away from the carrier. In such a case both bending actuators push the carrier in case they are bended in the direction facing the carrier or they pull the carrier in case they are bend in direction facing away from the carrier.

If at least four bending actuators are used, in particular arranged cross-like or star-like around the pivot it is technical sufficient, if all of the bending actuators are bendable in direction facing the carrier or are bendable in direction facing away from the carrier. In a special embodiment it is possible in general that two bending actuators are working together as protagonist and antagonist and are arranged opposite in respect to the pivot. In such a case the protagonist and the antagonist forming couple of bending actuators are both comprising at least moving in the same direction.

In an further embodiment of the adjustment unit it is preferred, that the at least one first bending actuator, the at least one second bending actuator and/or a at least one further bending actuator comprise a plurality of layers, in particular extending in the respective direction of the largest dimension.

Further it has been find out as advantage, if the at least one first bending actuator, the at least one second bending actuator and/or the at least one further bending actuator comprise entirely or at least one of the plurality of its layers a polymer, ceramic and/or metal, in particular an electroactive polymer (EAP), an interpenetrating polymer network (IPN), a conducting polymers (CP), a dielectric polymers, carbon materials, i.e. carbon nanotubes (CNTs), carbide derived carbon (CDC) and/or grapheme, Nafion, a bi-metal or an ionic polymer metal composite (IPMC).

The first bending actuator, the second bending actuator and/or the at least one further bending actuator can comprise the polymer, ceramic and/or metal entirely or in at least one of a plurality of layers. If the first bending actuator, the second bending actuator and/or the at least one further bending actuator comprise said material in at least one of its layers it is preferred, that further layers are flexible.

In an further embodiment of the adjustment unit it has been advantageously if the stimuli supply of the at least one first bending actuator, the at least second bending actuator and/or a at least one further bending actuator is entirely or at least with one of the plurality of its layers connectable or connected to an external stimuli, i.e. voltage, temperature, pressure, humidity or pH and/or that the stimuli supply causes an ion or electron movement within the respective bending actuator and/or comprises redox reaction within the respective bending actuator.

A further embodiment of the adjustment unit is characterized by that the first fastening means, the second fastening means and/or the further fastening means are separate or separately parts or are elements of a common fastening part, in particular an injection-moulded part, in particular a back plate, and/or that the pivot is attachable or attached to the fastening part and/or that the pivot and the fastening part are a common part, in particular an injection-moulded part.

If the fastening part comprise all fastening means and the pivot and is in particular building by an injecting molding part, the adjustment unit can be realized cost-saving and with a reduced number of parts.

To have an easy kinematics it is preferred, that the respective first ends of the respective bending actuators are located closer to the pivot than the respective second ends of the respective bending actuators.

Further, the task is solved by a rear view device for a vehicle comprising a rear view member and an adjustment unit, in particular comprising one or more of the features described before, with a pivot, with a carrier, the rear view member is attached to, mounted moveable, in particular tiltable, to the pivot, with at least one first bending actuator, which has its largest dimension in a first direction, which is adjustable bendable angular or crosswise to the first direction, which is fixed with a first end to a first fastening means and which is fixed with a second end to the carrier, and with at least one second bending actuator, which has its largest dimension in a second direction angular or crosswise to the first direction, which is bendable angular or crosswise to the second direction, which is fixed with a first end to the first fastening means or to a further fastening means and which is fixed with a second end to the carrier, wherein a bending of the first bending actuator and/or of the second bending actuator effects a movement of the carrier, whereby the first direction of the first bending actuator and/or the second direction of the second actuator run through the centre of the pivot.

In an embodiment of the rear view device it is preferred, that a back plate being or comprising the first, the second and/or the further fastening means and/or the pivot. In such a case the back plate and the fastening means are a common part, in particular a moulded part.

In general the carrier and the rear view member can be separate parts or are a common part.

In general the rear view member can be any device that provides a view of the rear portion of for example a vehicle.

In a preferred embodiment the rear view member can comprise a glass mirror, a plastic mirror, a camera and/or sensor.

An automatic adjustment of the view provided by the rear view device can be achieved if the rear view device comprises a control unit for adjusting the respective stimuli supplies for adjusting the bending of respective bending actuators.

Finally, the task is achieved by a vehicle with a rear view device, in particular with any of the preceding features, and/or with an adjustment unit, in particular with any of the preceding features.

The adjustment unit, the rear view device and the vehicle are advantages in several aspects:

For having at least one first bending actuator, which has its largest dimension in a first direction and by having at least one second bending actuator which has its largest dimension in a second direction and the first direction and the second direction run through the centre of the pivot a compact adjustment unit is achieved.

Various aspects of this invention will become apparent to those skilled in the art from the following detailed description of the preferred embodiment, when read in light of the accompanying drawings.

BRIEF DESCRIPTION OF THE DRAWINGS

FIG. 4 a schematic plan view on the second embodiment of the adjustment unit comprising two bending actuators;

FIG. 5 a schematic plan view of the third embodiment of the adjustment unit comprising four bending actuators;

FIG. 6 a schematic plan view of an fourth embodiment of the adjustment unit comprising eight bending actuators.

FIG. 7 a schematic side view of an alternative embodiment of the bending actuator of FIG. 1 comprising a plurality of layers of bending elements.

DETAILED DESCRIPTION OF THE PREFERRED EMBODIMENTS

Figure 1:
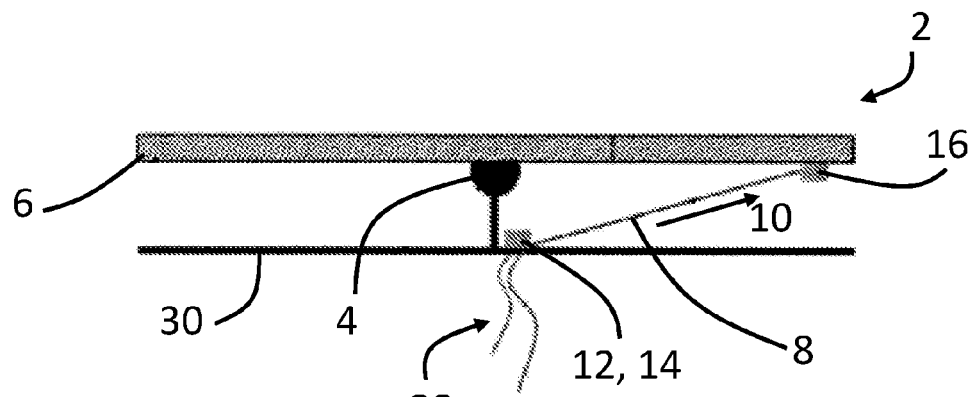
FIG. 1 illustrates a schematic side-view of a first embodiment of an adjustment unit in an unbent arrangement.

The figures show embodiments of an adjustment unit 2 for a rear view device for a vehicle. The shown embodiments of the adjustment 2 each comprise a pivot 4 and a carrier 6 mounted movable, in particular tiltable to the pivot 4. To move the carrier 6 the adjustment unit 2 comprise a first bending actuator 8 which has its largest dimension in a first direction 10. The first bending actuator 8 is adjustable bendable angular or crosswise to the first direction 10. The first bending actuator 8 is fixed with the first end 12 to a first fastening means 14 and with a second end 16 to the carrier 6. As shown in FIG. 7, an embodiment of the first bending actuator 8 is shown as bending actuator 8' formed as a plurality of layers 8'a, 8'b, and 8'c, though more layers of fewer layers may be provided as desired. As illustrated in FIG. 7, the layers 8'a, 8'b, and 8'c extend in the respective direction of the largest dimension. The layers 8'a, 8'b, and 8'c may be formed entirely of or at least one of the plurality of layers formed from a polymer, ceramic and/or metal. The polymer, ceramic, and/or metal may comprise an electroactive polymer (EAP), an interpenetrating polymer network (IPN), a conducting polymers (CP), a dielectric polymers, carbon materials, i.e. carbon nanotubes (CNTs), carbide derived carbon (CDC) and/or grapheme (IPMC). Nafion, a bi-metal or an ionic polymer metal composite (IPMC). The layers 8'a, 8'b, and 8'c may be entirely or at least with one of the plurality of its layers connectable or connected to an external stimuli, i.e. voltage, temperature, pressure, humidity or pH and/or that the stimuli supply causes an ion or electron movement within the respective bending actuator and/or comprises redox reaction within the respective bending actuator.

As shown in FIGS. 4 to 6 the adjustment unit 2 also comprises a second bending actuator 18 which has its largest dimension in a second direction angular or crosswise to the first direction 10 in which is bendable angular or crosswise to the second direction 20. The second bending actuator 18 is fixed with a first end 22 to a further fastening mean 24 and fixed with a second end 26 to the carrier 6. Thus, the first bending actuator 8 and the second bending actuator run with their first direction 10 and their second direction 20 through the centre of the pivot 4.

Figure 2:
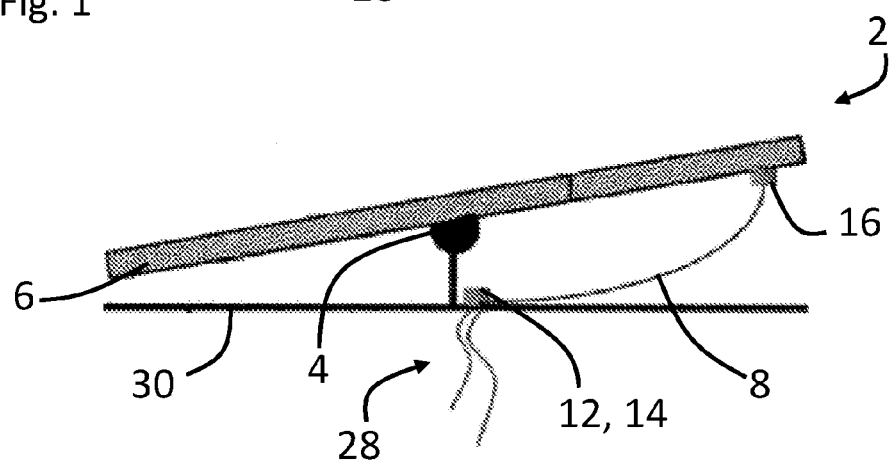
FIG. 2 illustrates the adjustment unit of FIG. 1 in an arrangement bent in a direction facing the carrier.
Figure 3:
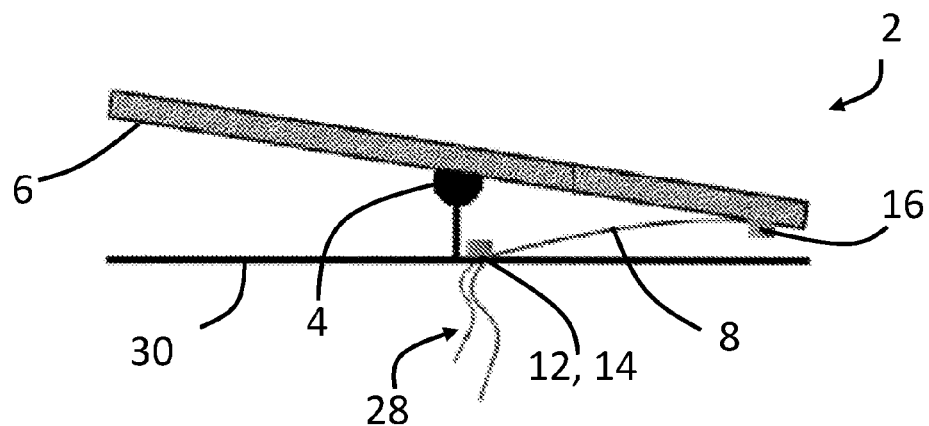
FIG. 3 illustrates the adjustment unit of FIG. 1 in an arrangement bended in direction facing away the carrier.

As can be derived by FIGS. 1 to 3 the first bending actuator 8 is connected to a first stimuli supply 28. Depending on the stimuli applied by the first stimuli supply 28 the bendability of the respective bending actuators is adjustable.

In the shown embodiment in FIGS. 1 to 3 the first fastening means 14 is part of a common fastening part 13 which also comprises the pivot 4 in the same common part.

FIG. 1 shows the adjustment unit 2 in a not-bended arrangement.

FIG. 2 shows the adjustment unit 2 in a bended arrangement that the first bending actuator 8 is bended in direction facing the carrier 6. Because of the bending of the first bending actuator 8 the carrier 6 has been tilted around the pivot 4.

FIG. 3 shows the adjustment unit 2 in another bended arrangement, in which the first bending actuator 8 has been bended in a direction facing away from the carrier 6. Also by said bending a carrier 6 has been tilted around the pivot 4.

FIG. 4 shows an second embodiment of the adjustment unit 2 comprising a first bending actuator 8 and the second bending actuator 18. The first bending actuator and the second bending actuator 18 are arranged in such a manner that the first direction 10 and the second direction 20 are crosswise.

FIG. 5 shows a third embodiment of the adjustment unit 2 comprising two further bending actuators 32 that build a cross-like pattern with the first bending actuator 8 and the second bending actuator 18.

FIG. 6 shows a fourth embodiment of the adjustment unit 2 comprising eight bending actuators at all building a star-like pattern.

The features disclosed in the specification, the claims and the figures maybe important for the claimed invention, taken separately or in any combination, for the respective different embodiments.

The principle and mode of operation of this invention have been explained and illustrated in its preferred embodiments. However, it must be understood that this invention may be practiced otherwise than as specifically explained and illustrated without departing from its spirit or scope.

The invention claimed is:

1. An adjustment unit for a rear view device for a vehicle having a pivot, a carrier moveably mounted and configured to be tiltable relative to the pivot, at least one first bending actuator, the first bending actuator having a largest dimension in a first direction and is adjustably bendable in one of an angular or crosswise direction relative to the first direction, the first bending actuator is fixed with a first end to a first fastener and fixed with a second end to the carrier, and at least one second bending actuator having a largest dimension in a second direction that is one of an angular or crosswise direction to the first direction, the second actuator being bendable angularly or crosswise to the second direction and being fixed with a first end to one of the first fastener or a further fastener and being fixed with a second end to the carrier, the respective first ends of the respective bending actuators are located closer to the pivot than the respective second ends of the respective bending actuators, wherein a bending of the first bending actuator and/or of the second bending actuator effects a movement of the carrier, and wherein the first direction of the first bending actuator and/or the second direction of the second bending actuator run through the center of the pivot, at least one of the at least one first bending actuator and the at least one second bending actuator are adjustably bendable in at least one of a direction facing the carrier or facing away from the carrier to push and/or to pull the carrier.

2. The adjustment unit according to claim 1, wherein the at least one first bending actuator is connectable or connected to a first stimuli supply and that the adjustable bendability angular or crosswise to the first direction is dependent on the stimuli applied by the first stimuli supply and/or that the at least one second bending actuator is connectable or connected to the first stimuli supply or to a second stimuli source and that the adjustable bendability angular or crosswise to the second direction is dependent on the stimuli applied by the respective first or second stimuli supply.

3. The adjustment unit according to claim 1, wherein at least one further bending actuator has a largest dimension in a further direction, the further bending actuator being connectable or connected to the first stimuli supply or to a further stimuli supply and which is adjustably bendable angular or crosswise relative to the further direction depending on the stimuli applied by the first stimuli supply or by the further stimuli supply, the further bending actuator is fixed with a first end to one of the first fastener or a further fastener and fixed with a second end to the carrier.

4. The adjustment unit according to claim 1, wherein the at least one first bending actuator, the at least second bending actuator and/or an at least one further bending actuator comprise a plurality of layers, in particular extending in the respective direction of the largest dimension.

5. The adjustment unit according to claim 4, wherein the at least one first bending actuator, the at least one second bending actuator and/or the at least one further bending actuator comprise, entirely or at least one of the plurality of the respective bending actuator layers, one of an electroactive polymer (EAP), an interpenetrating polymer network (IPN), a conducting polymers (CP), a dielectric polymers, or carbon materials, the carbon materials being one of carbon nanotubes (CNTs), carbide derived carbon (CDC) and/or grapheme, Nafion, a bi-metal or an ionic polymer metal composite (IPMC).

6. The adjustment unit according to claim 4, wherein the at least one first bending actuator, the at least second bending actuator and/or the at least one further bending actuator is entirely or at least with one of the plurality of its layers connectable or connected to an external stimuli, the external stimuli being at least one of voltage, temperature, pressure, humidity or pH and/or that the external stimuli causes an ion or electron movement within the respective bending actuator and/or comprises redox reaction within the respective bending actuator.

7. The adjustment unit according to claim 1, wherein the first fastener, the second fastener and/or a further fastener are one of separate parts or elements of a common fastening part that is configured as an injection-moulded back plate, and/or that the pivot is attachable or attached to the fastening part and/or that the pivot and the fastening part are a common injection-moulded part.

8. A rear view device for a vehicle, comprising a rear view member and the adjustment unit according to claim 1.

9. The rear view device according to claim 8, wherein a back plate being or comprising the first, the second and/or the further fastener and/or the pivot.

10. The rear view device according to claim 8, wherein the carrier and the rear view member are a common part.

11. The rear view device according to claim 8, wherein the rear view member comprises a glass mirror, plastic mirror, camera and/or sensor.

12. The rear view device according to claim 8, wherein a control unit adjusts one or more stimuli supplies operatively connected to one or more of the first, second and/or third bending actuators for adjusting the bending of the respective bending actuators.

13. A vehicle having a rear view device according to claim 8 having an adjustment unit wherein the at least one first bending actuator is connectable or connected to a first stimuli supply and that the adjustable bendability angular or crosswise to the first direction is dependent on the stimuli applied by the first stimuli supply and/or that the at least one second bending actuator is connectable or connected to the first stimuli supply or to a second stimuli source and that the adjustable bendability angular or crosswise to the second direction is dependent on the stimuli applied by the respective first or second stimuli supply.

* * * * *